(12) United States Patent
Hemmer et al.

(10) Patent No.: US 10,654,389 B2
(45) Date of Patent: May 19, 2020

(54) HEADREST WITH AN IMPROVED ADJUSTMENT DEVICE

(71) Applicant: Jifeng Automotive Interior GmbH, Kitzingen (DE)

(72) Inventors: Michael Hemmer, Hürth (DE); Denis Quandt, Köln (DE); Jürgen Hürtgen, Zülpich-Sinzenich (DE); Christoph Seidel, Iphofen (DE); Rolf Steinmetz, Düsseldorf-Angermund (DE)

(73) Assignee: Jifeng Automotive Interior GmbH, Kitzingen (DE)

( * ) Notice: Subject to any disclaimer, the term of this patent is extended or adjusted under 35 U.S.C. 154(b) by 0 days.

(21) Appl. No.: 16/080,150

(22) PCT Filed: Feb. 24, 2017

(86) PCT No.: PCT/EP2017/057396
§ 371 (c)(1),
(2) Date: Aug. 27, 2018

(87) PCT Pub. No.: WO2017/148831
PCT Pub. Date: Sep. 8, 2017

(65) Prior Publication Data
US 2019/0047455 A1 Feb. 14, 2019

(30) Foreign Application Priority Data

Feb. 29, 2016 (DE) .................. 10 2016 103 558

(51) Int. Cl.
*B60N 2/80* (2018.01)
*B60N 2/806* (2018.01)
(Continued)

(52) U.S. Cl.
CPC ............ *B60N 2/862* (2018.02); *B60N 2/865* (2018.02)

(58) Field of Classification Search
CPC .......................... B60N 2/862; B60N 2/865
(Continued)

(56) References Cited

U.S. PATENT DOCUMENTS

| 6,550,856 | B1 * | 4/2003 | Ganser | ..................... | B60N 2/20 |
| | | | | | 297/391 X |
| 6,688,697 | B2 * | 2/2004 | Baumann | ............... | B60N 2/865 |
| | | | | | 297/391 |

(Continued)

FOREIGN PATENT DOCUMENTS

| EP | 1584514 A2 * | 10/2005 | ............. B60N 2/888 |
| EP | 2106963 A1 * | 10/2009 | ............. B60N 2/888 |

(Continued)

*Primary Examiner* — Rodney B White
(74) *Attorney, Agent, or Firm* — M&B IP Analysts, LLC

(57) ABSTRACT

A headrest for a motor vehicle, including a base part for attachment to a backrest of a vehicle seat, a head part for contact with a head of a vehicle occupant, and an adjusting device between the base part and the head part for causing a substantially linear adjustment of the head part between a minimum and a maximum position. The adjusting device has an intermediate part and several pivot levers which pivot synchronously during adjustment and form a first articulated parallelogram between the head part and intermediate part and a second articulated parallelogram between the intermediate part and base part. The adjusting device includes a synchronizing lever for setting a relative orientation of the head part with respect to the base part during adjustment and wherein the headrest further has a latching device for fixing the headrest in a latching manner relative to the base part.

14 Claims, 15 Drawing Sheets

Figure 1:
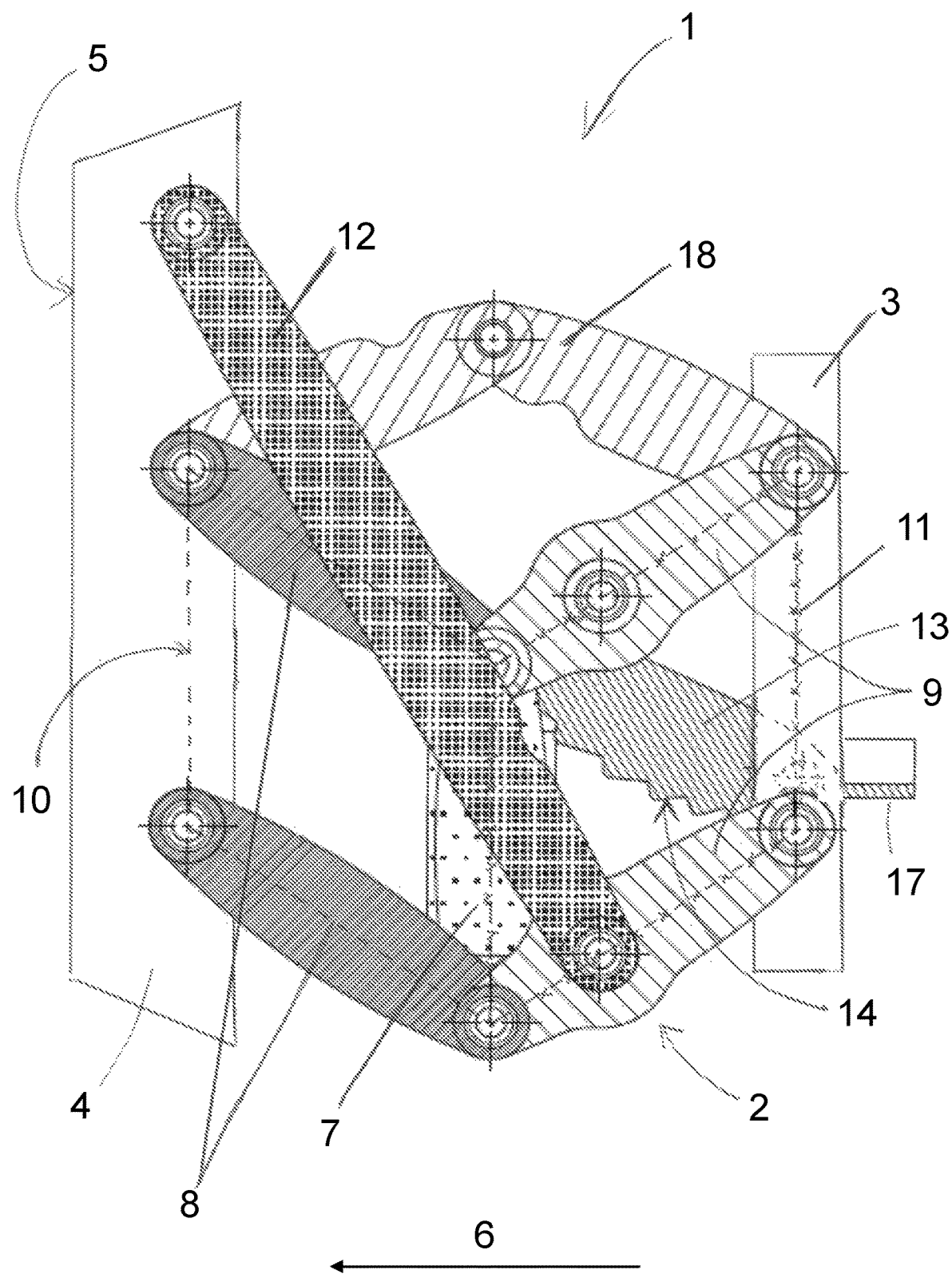

(51) Int. Cl.
*B60N 2/829* (2018.01)
*B60N 2/838* (2018.01)
*B60N 2/853* (2018.01)
*B60N 2/865* (2018.01)
*B60N 2/862* (2018.01)

(58) Field of Classification Search
USPC .......................... 297/216.12, 391, 408, 409
See application file for complete search history.

(56) References Cited

U.S. PATENT DOCUMENTS

| | | | | |
|---|---|---|---|---|
| 7,070,235 B2 * | 7/2006 | Schilling | ................ | B60N 2/888 |
| | | | | 297/216.12 |
| 7,073,856 B2 * | 7/2006 | Akaike | ................ | B60N 2/0232 |
| | | | | 297/216.12 |
| 7,350,859 B2 * | 4/2008 | Klukowski | ............ | B60N 2/888 |
| | | | | 297/216.12 |
| 7,484,797 B2 * | 2/2009 | Akaike | ................ | B60N 2/821 |
| | | | | 297/216.12 |
| 7,517,015 B2 * | 4/2009 | Terada | ................... | B60N 2/888 |
| | | | | 297/216.12 |
| 7,520,564 B2 * | 4/2009 | Woerner | ................ | B60N 2/865 |
| | | | | 297/408 X |
| 7,611,196 B2 * | 11/2009 | Terada | ................... | B60N 2/888 |
| | | | | 297/216.12 |
| 7,618,091 B2 * | 11/2009 | Akaike | ................ | B60N 2/002 |
| | | | | 297/391 X |
| 7,717,507 B2 * | 5/2010 | Toda | ...................... | B60N 2/862 |
| | | | | 297/406 X |
| 7,963,598 B2 * | 6/2011 | Akaike | ................ | B60N 2/002 |
| | | | | 297/216.12 |
| 8,616,633 B2 * | 12/2013 | Truckenbrodt | ........ | B60N 2/865 |
| | | | | 297/391 X |
| 8,632,125 B2 * | 1/2014 | Yamaguchi | ............ | B60N 2/002 |
| | | | | 297/216.12 |
| 9,446,695 B2 * | 9/2016 | Ishihara | ................ | B60N 2/4228 |
| 9,457,700 B2 * | 10/2016 | Ishihara | ................ | B60N 2/4228 |
| 9,789,794 B1 * | 10/2017 | Roychoudhury | .... | B60N 2/4228 |
| 9,789,795 B2 * | 10/2017 | Ishihara | ................ | B60N 2/862 |
| 10,315,546 B2 * | 6/2019 | An | ........................... | A47C 7/38 |
| 2004/0262974 A1 * | 12/2004 | Terada | ................... | B60N 2/865 |
| | | | | 297/407 |
| 2007/0246989 A1 * | 10/2007 | Brockman | ............ | B60N 2/865 |
| | | | | 297/391 |
| 2010/0127548 A1 | 5/2010 | Truckenbrodt et al. | | |
| 2010/0314918 A1 * | 12/2010 | Alexander | ............ | B60N 2/862 |
| | | | | 297/216.12 |
| 2015/0239378 A1 * | 8/2015 | Ishihara | ................ | B60N 2/815 |
| | | | | 297/391 |
| 2015/0251575 A1 * | 9/2015 | Ishihara | ................ | B60N 2/829 |
| | | | | 297/391 |
| 2015/0329023 A1 * | 11/2015 | Ishihara | ................ | B60N 2/865 |
| | | | | 297/406 |
| 2015/0352989 A1 * | 12/2015 | Ishihara | ................ | B60N 2/865 |
| | | | | 297/406 |
| 2016/0129816 A1 * | 5/2016 | Lee | ........................ | B60N 2/865 |
| | | | | 297/409 |
| 2017/0174108 A1 * | 6/2017 | An | ........................ | B60N 2/0232 |
| 2018/0001803 A1 * | 1/2018 | Ishihara | ................ | B60N 2/862 |
| 2019/0126798 A1 * | 5/2019 | Spackman | ............. | B60N 2/865 |

FOREIGN PATENT DOCUMENTS

| | | | | |
|---|---|---|---|---|
| EP | 2901894 A1 | 8/2015 | | |
| WO | WO-2004014688 A1 * | 2/2004 | ............ | B60N 2/888 |
| WO | 2014122379 A1 | 8/2014 | | |

* cited by examiner

A-A

B-B

HEADREST WITH AN IMPROVED ADJUSTMENT DEVICE

This application claims priority under 35 U.S.C. § 371 to the International Application No. PCT/EP2017/054396, filed Feb. 24, 2017, and to the German Application No. 10 2016 103 558.0, filed Feb. 29, 2016, now pending, the contents of which are hereby incorporated by reference.

The present disclosure relates to a headrest with an adjusting device. The adjusting device according to the present disclosure is provided for adjusting, in a substantially linear manner, the head part that belongs to the headrest and is provided for contact with the head of an occupant relative to a base part. Such headrests with an adjusting device are known in the motor vehicle sector, in particular. The adjustment of the headrest is generally effected manually and serves for increasing the comfort and/or safety of the vehicle occupants sitting on the associated vehicle seat, because an optimum adaptation of the head part providing a support surface to the head position resulting from the sitting position and/or body size of the occupant is made possible due to the adjustment, and, in particular, a distance between the support surface and the head can be minimized. The adjustment including the fixing thereof has to be comparatively simple, low-friction and wear-free, and moreover, it has to be possible to manufacture the headrest inexpensively. Furthermore, a secure lock of the headrest in the respective position has to be ensured.

It is therefore the object of the present disclosure to provide a headrest with an adjusting device which has these characteristics. The object is achieved with a headrest having the features of claim 1. Advantageous embodiments are in each case the subject matter of the dependent claims. Preferred embodiments are illustrated in the Figures, without limiting the present disclosure to the embodiments shown.

The present disclosure relates to a headrest for a motor vehicle, comprising a base part for attachment to a backrest of a vehicle seat, e.g. of one of the front seats or one of the seats in the back of the passenger compartment. Further, the headrest has a head part to which a padding part is attached, for example, and which is configured for the contact with a head of a vehicle occupant. Further, an adjusting device is provided between the base part and the head part for causing a substantially linear adjustment of the head part relative to the base part. The adjustment is effected between a minimum position, in which the distance between the base part and the head part is at minimum, and a maximum position, in which the distance between the base part and the head part is at maximum. Even if, in the substantially linear linear adjustment, an adjustment along a slightly curved path is not to be excluded, the adjusting device is particularly suitable for realizing a strictly linear adjustment. With respect to the direction of the adjustment, an adjustment which is vertical relative to the longitudinal vehicle axis is also conceivable with the adjusting device according to the present disclosure. Preferably, the adjusting device according to the present disclosure is designed to perform an adjustment in a direction parallel to the longitudinal vehicle axis (also referred to a longitudinal adjustment), or in a direction intersecting the longitudinal vehicle axis at an acute angle. Additional adjusting devices may also be provided in order to be able to additionally carry out an adjustment which is substantially vertical relative to the longitudinal vehicle axis (also referred to as height adjustment). The adjusting device has an intermediate part and several pivot levers which pivot synchronously during the adjustment and are arranged and configured in such a way that at least one first articulated parallelogram is formed between the head part and the intermediate part and at least one second articulated parallelogram is formed between the intermediate part and the base part. According to the present disclosure, the adjusting device further has at least one synchronizing lever, preferably two synchronizing levers, between the head part and the base part for setting a relative orientation of the head part with respect to the base part during adjustment and for synchronizing the pivoting motion of the pivot levers of the first articulated parallelogram with the pivoting motion of the pivot levers of the second articulated parallelogram. Preferably, the synchronizing lever is hinged with one end to the head part and with its other end to one of the pivot levers of the second or one of the second articulated parallelograms. Preferably, the adjusting device is at least partially, particularly preferably completely, made from plastic. However, it may also be at least partially or even completely made from metal or wood, for example. Furthermore, it may also be made from a combination of the aforementioned preferred materials.

The present disclosure is characterized in that the headrest further has a latching device for fixing the headrest in a latching manner relative to the base part. It was found that a comparatively variable adjustment of the head part relative to the base part can be reliably realized by means of a latching device. For example, the latching device is provided for providing a latching engagement between the head part and the base part or between the head part and the intermediate part. Preferably however, it is provided that the latching device is configured to form the latching engagement between the base part and the intermediate part or between the base part and one of the pivot levers of one of the second articulated parallelograms.

Preferably, the latching device has a unilaterally pivotably mounted latching lever. The latter is preferably operatively disposed between the base part and the intermediate part.

According to an alternative embodiment, the latching device may also have at least one latching lever connected to one of the pivot levers of one of the second articulated parallelograms.

According to a preferred embodiment, it is provided that the latching device has a latching contour defining several latching stages. Preferably, the latching contour is formed on the latching lever.

According to another embodiment, it is provided that the arrangement of the latching stages of the latching contour is defined by a curvature.

Preferably, it is provided that the unilaterally pivotably mounted latching lever is pivotably mounted on the base part and cooperates, for example, with a latching projection or latching bar provided on the intermediate part or with an axis provided on the intermediate part for pivotably mounting a pivot lever, in order to fix the intermediate part relative to the base part and thus, due to the coupling of the synchronizing lever, the head part relative to the base part.

In order to ensure a secure engagement, it is provided in a preferred embodiment that the unilaterally pivotably mounted latching lever is elastically biased in the direction of the latching engagement, i.e. in a manner establishing and retaining the latching engagement.

According to a preferred embodiment, the unilaterally pivotably mounted latching lever has at its pivotably fixed end a latching lever extension which defines an actuating surface for manually unlatching the latching engagement, e.g. between the latching lever and the intermediate part.

Preferably, it is provided that the adjusting device has at least two first and two second articulated parallelograms, and the latching device, in the maximum position of the headrest, is disposed at least partially, preferably completely, within the structural volume defined by the first and second articulated parallelograms, with the exception of the latching lever extension formed optionally on the unilaterally pivotably mounted latching lever at the pivotably fixed end thereof. Thus, a compact design of the headrest according to the present disclosure can be obtained.

Another advantageous embodiment provides that the latching device has an actuating means for manual unlatching, which follows the adjusting movement of the adjusting device caused during adjustment of the adjusting device and is operatively connected to the latching device, in contrast, for example, to the above-mentioned latching lever extension, which serves as an actuating surface and is formed on the unilaterally pivotably mounted latching lever, and which does not follow the adjusting movement of the adjusting device in a state in which the headrest is installed in the vehicle. The actuating means moving along with the adjusting device may advantageously be provided, for instance, on the side of the headrest and, for example, be actuated by means of an actuating member, e.g. a button, switch, lever and the like, which is disposed on the headrest. Thus, manual unlatching of the latching device for the adjustment of the adjusting device by a vehicle occupant in a more comfortable manner is possible, due to the better accessibility obtained at the head part.

According to another version, it is provided that the pivoting movement of at least one pivot lever is provided with a stop in order to limit the adjustment of the head part in the maximum position. According to a preferred variant, however, a toggle mechanism is also provided, for example between the head part and the base part, in order to limit the adjustment of the head part relative to the base part in the maximum position. For example, the limitation of the adjustment displacement is realized by means of a first lever arm pivotably mounted on the base part and a second lever arm pivotably mounted on the head part, which are pivotably connected with their opposite ends.

Figure 2:
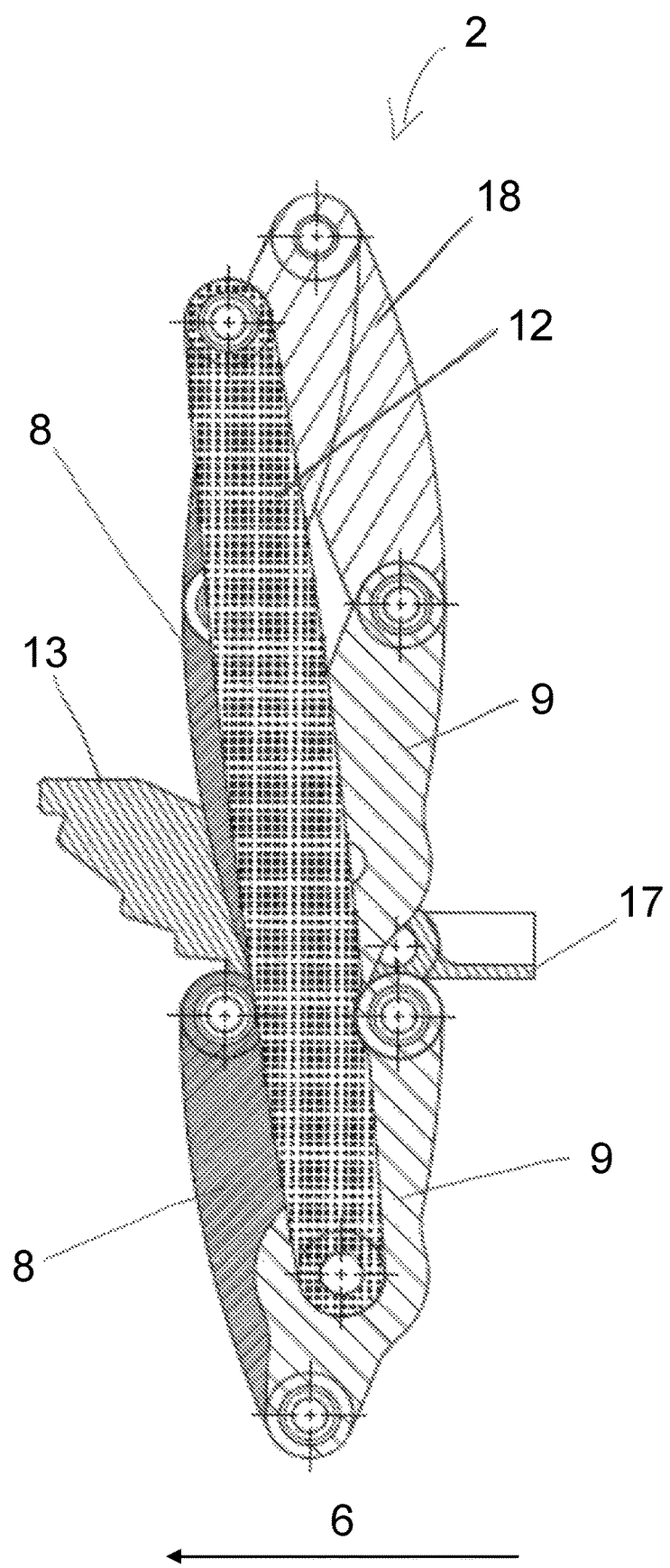
Figure 3:
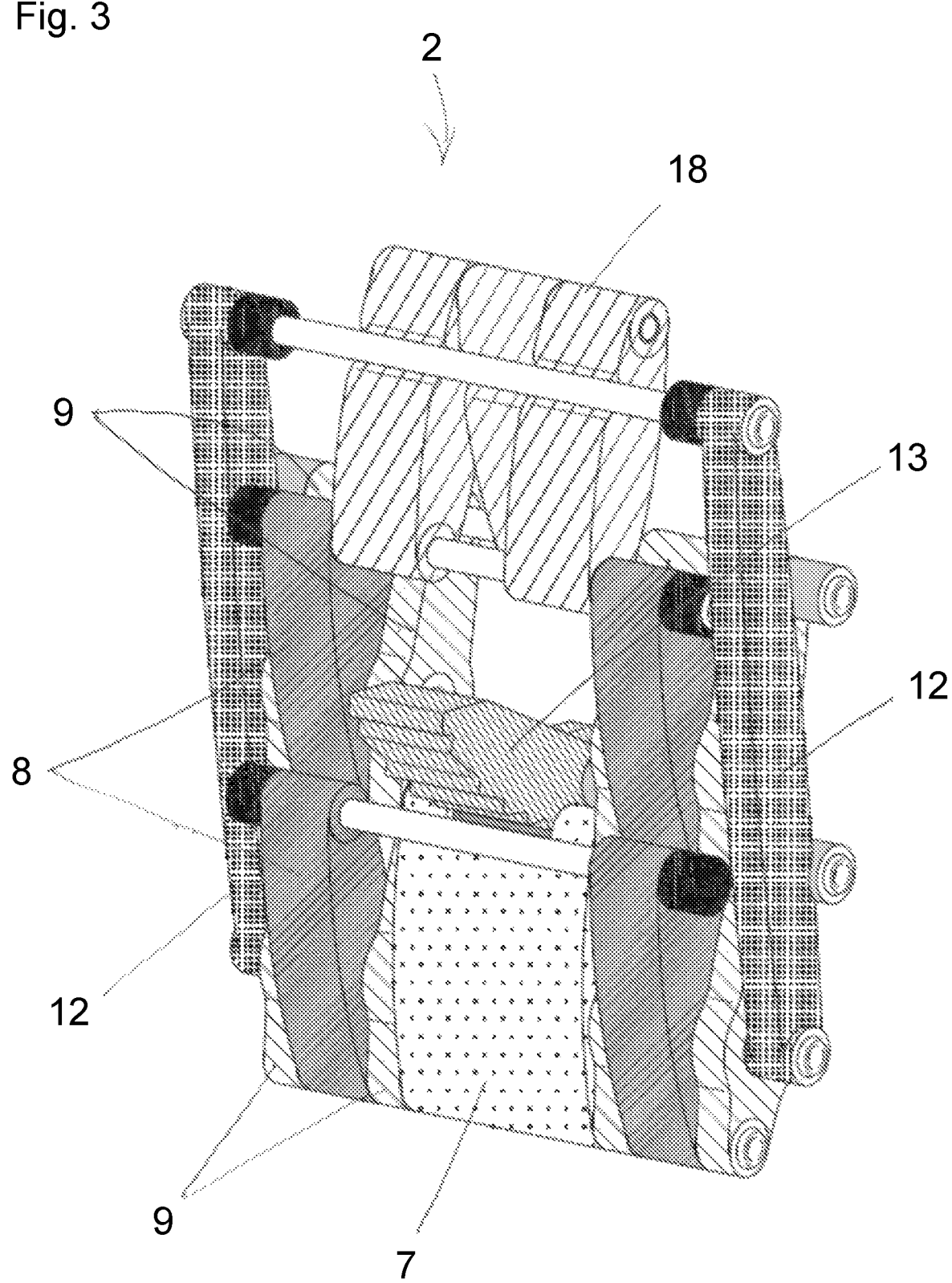
Figure 4:
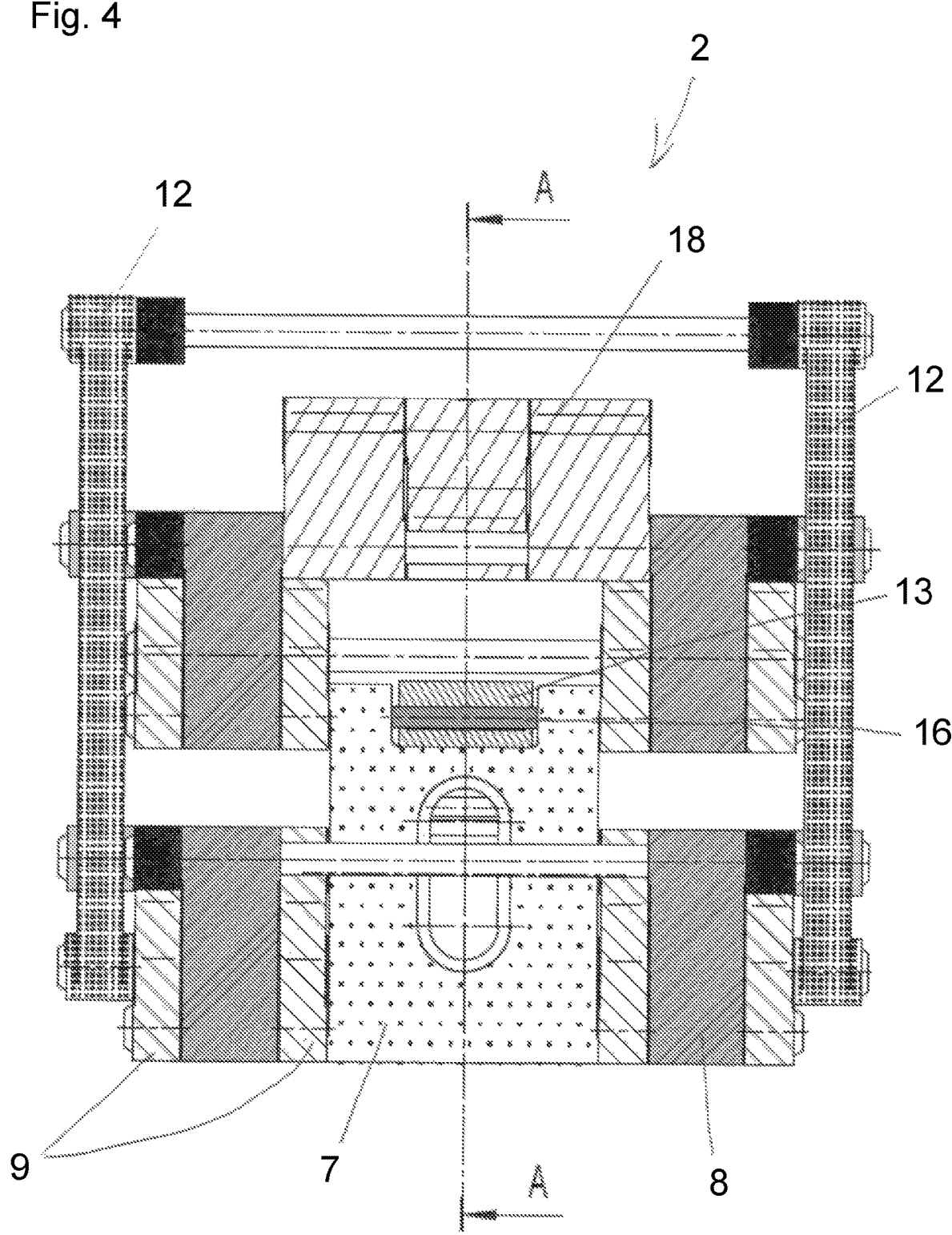
Figure 5:
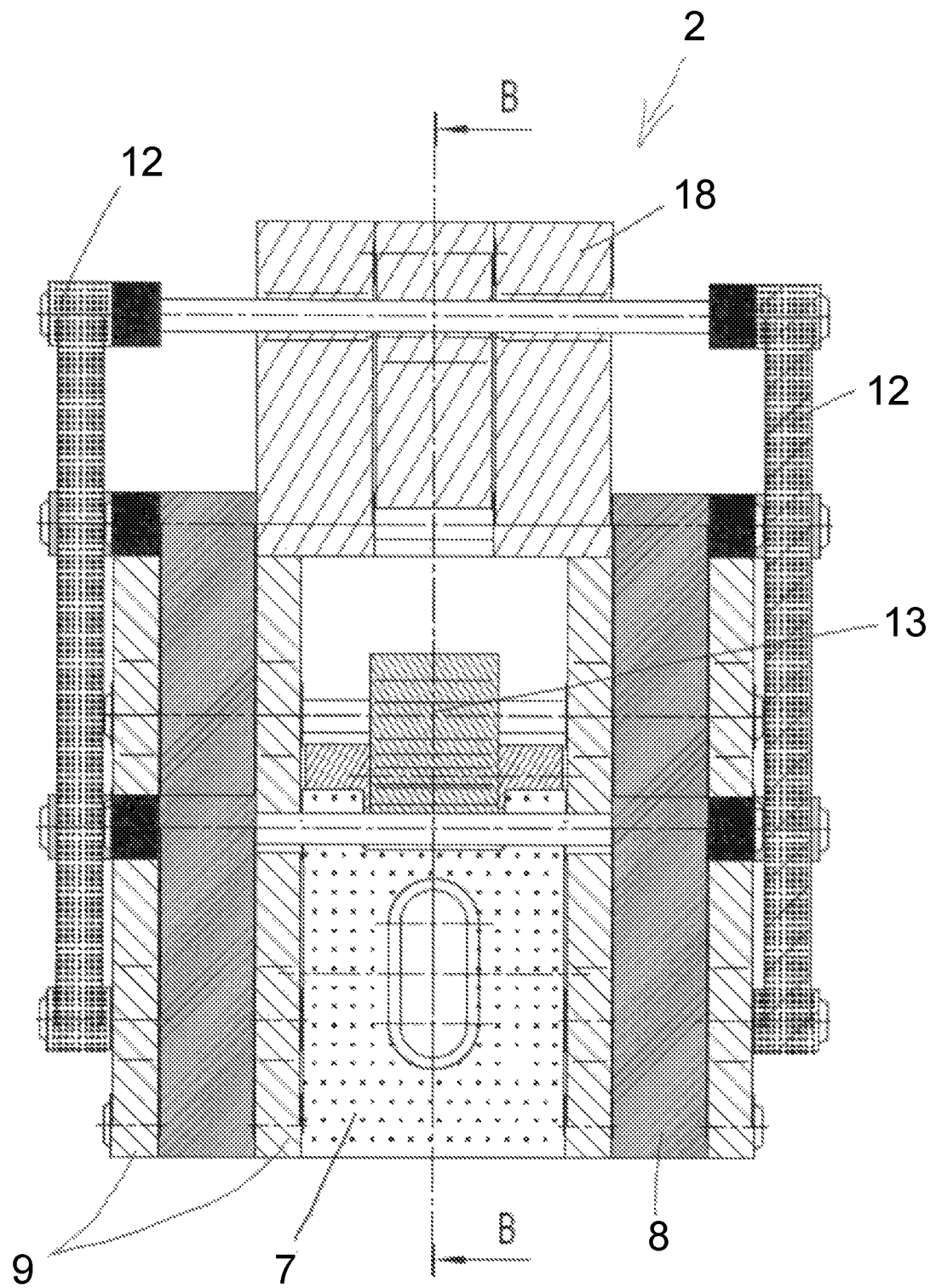
Figure 6:
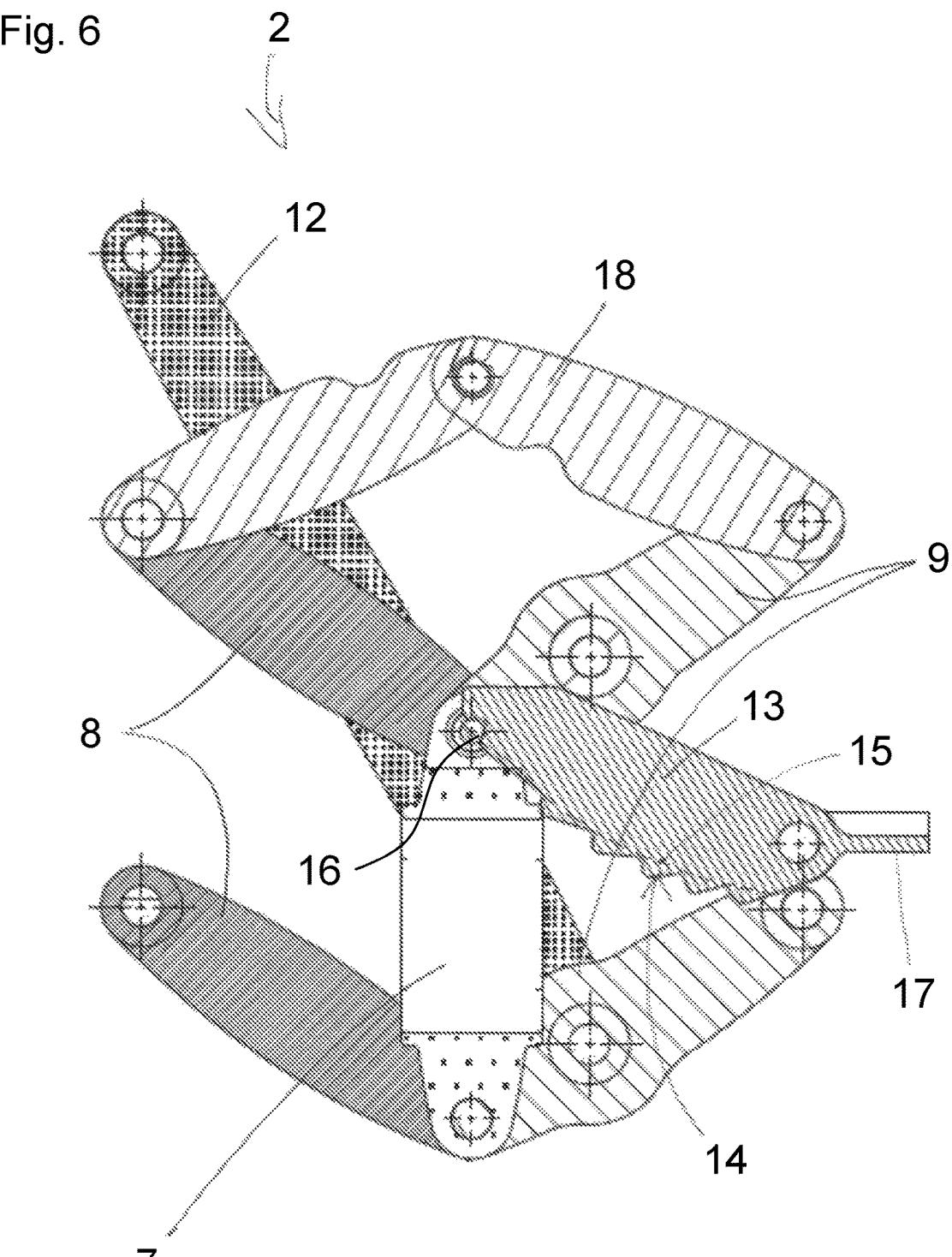
Figure 7:
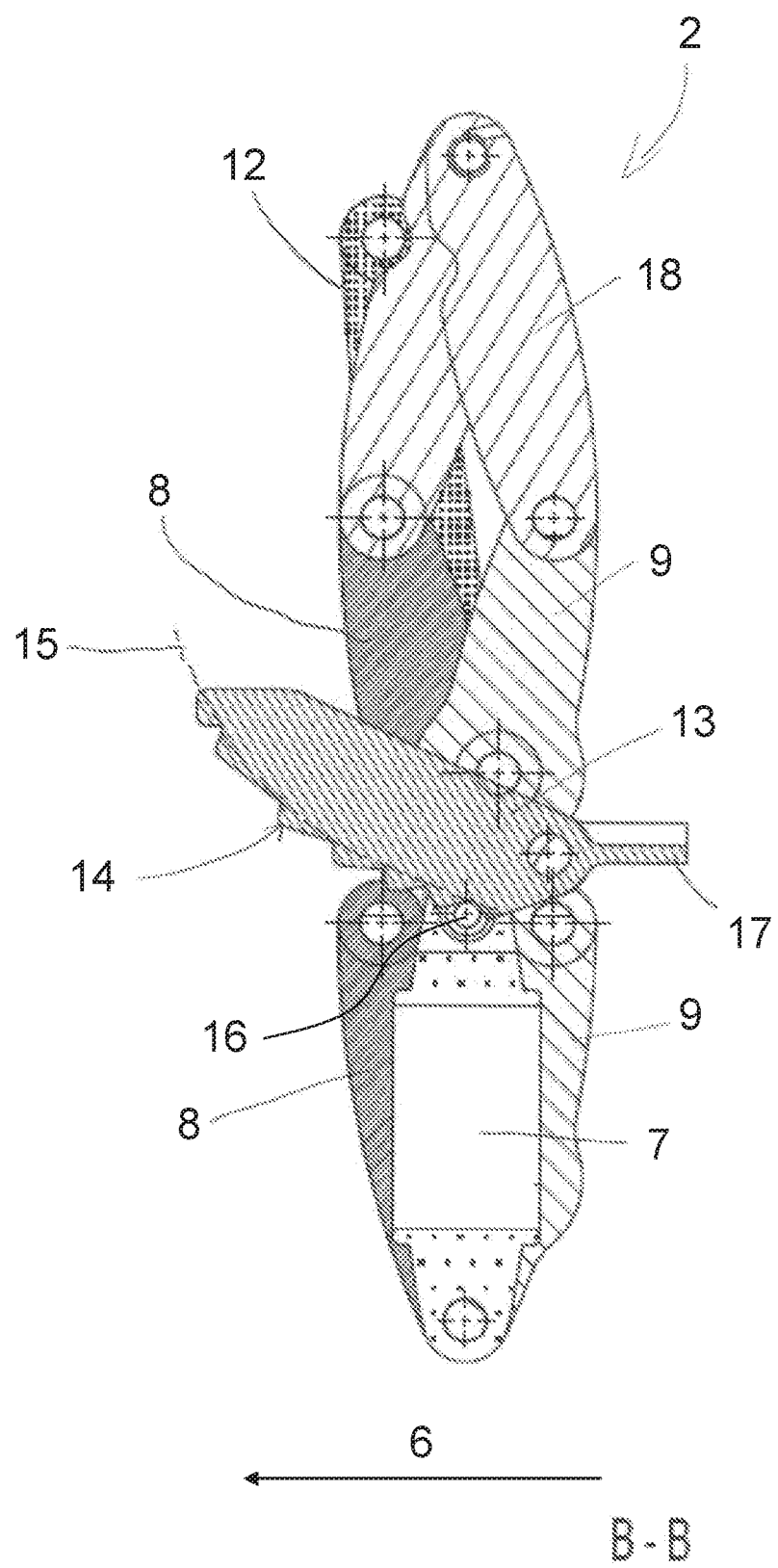
Figure 8:
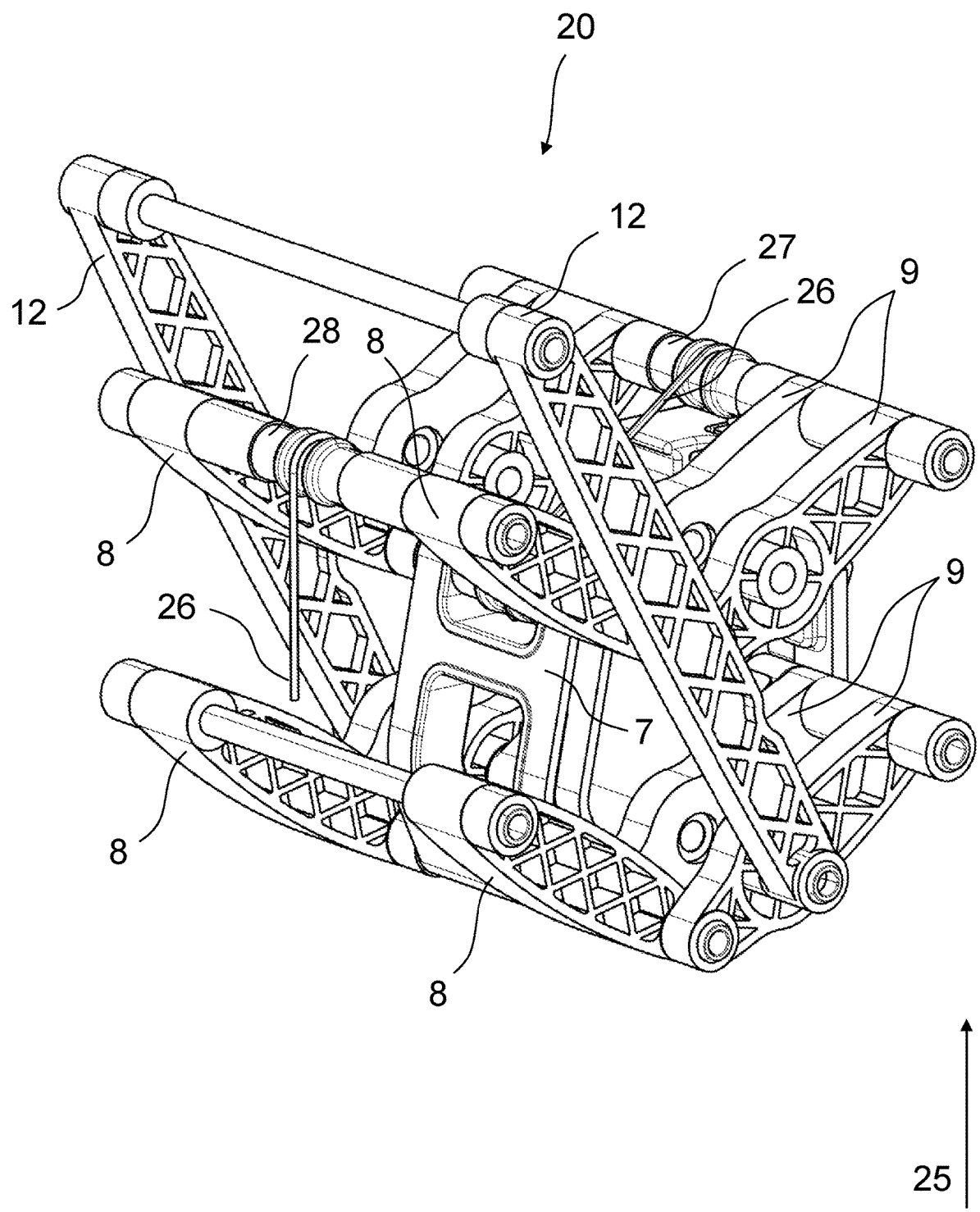
Figure 9:
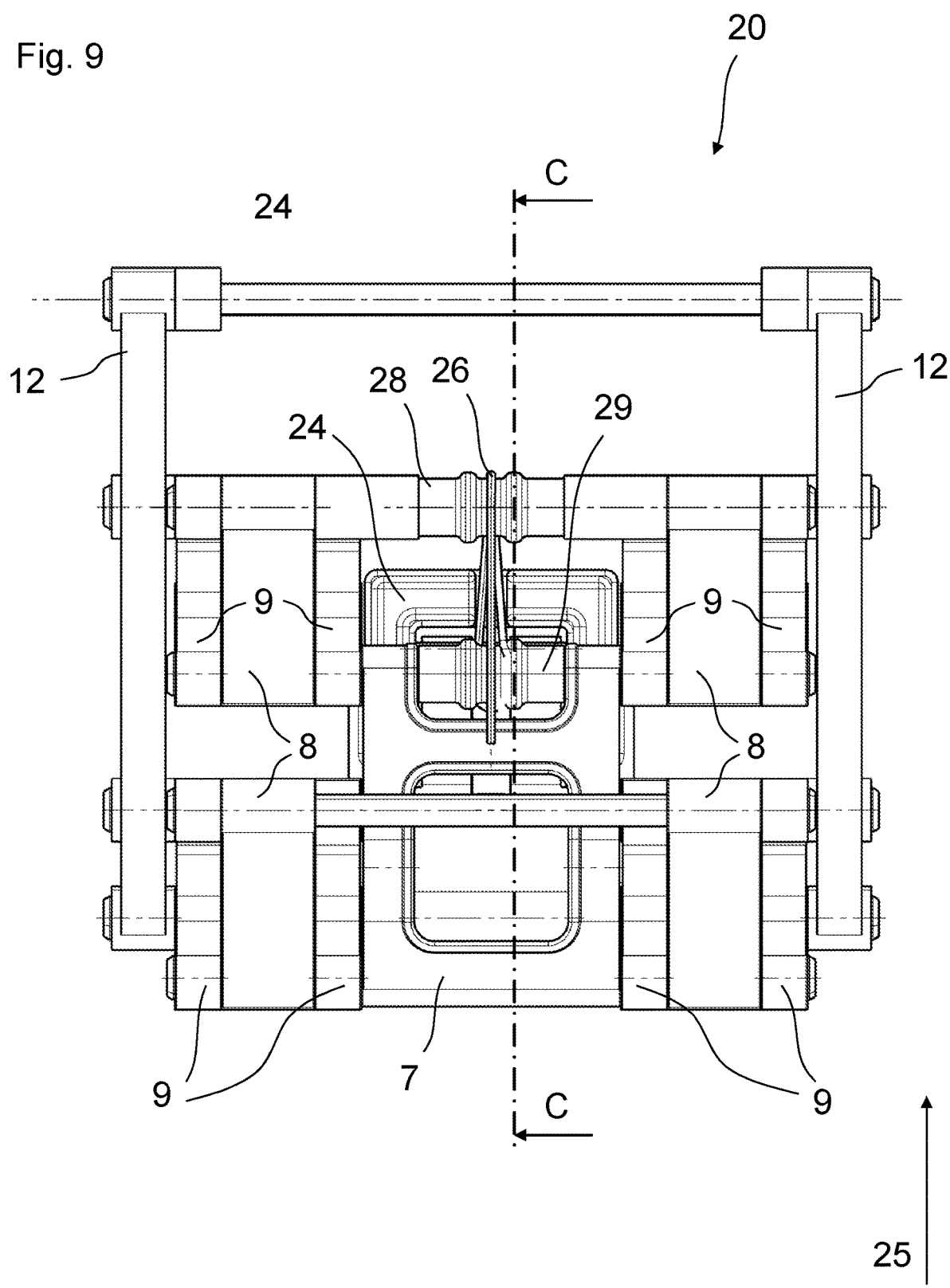
Figure 10:
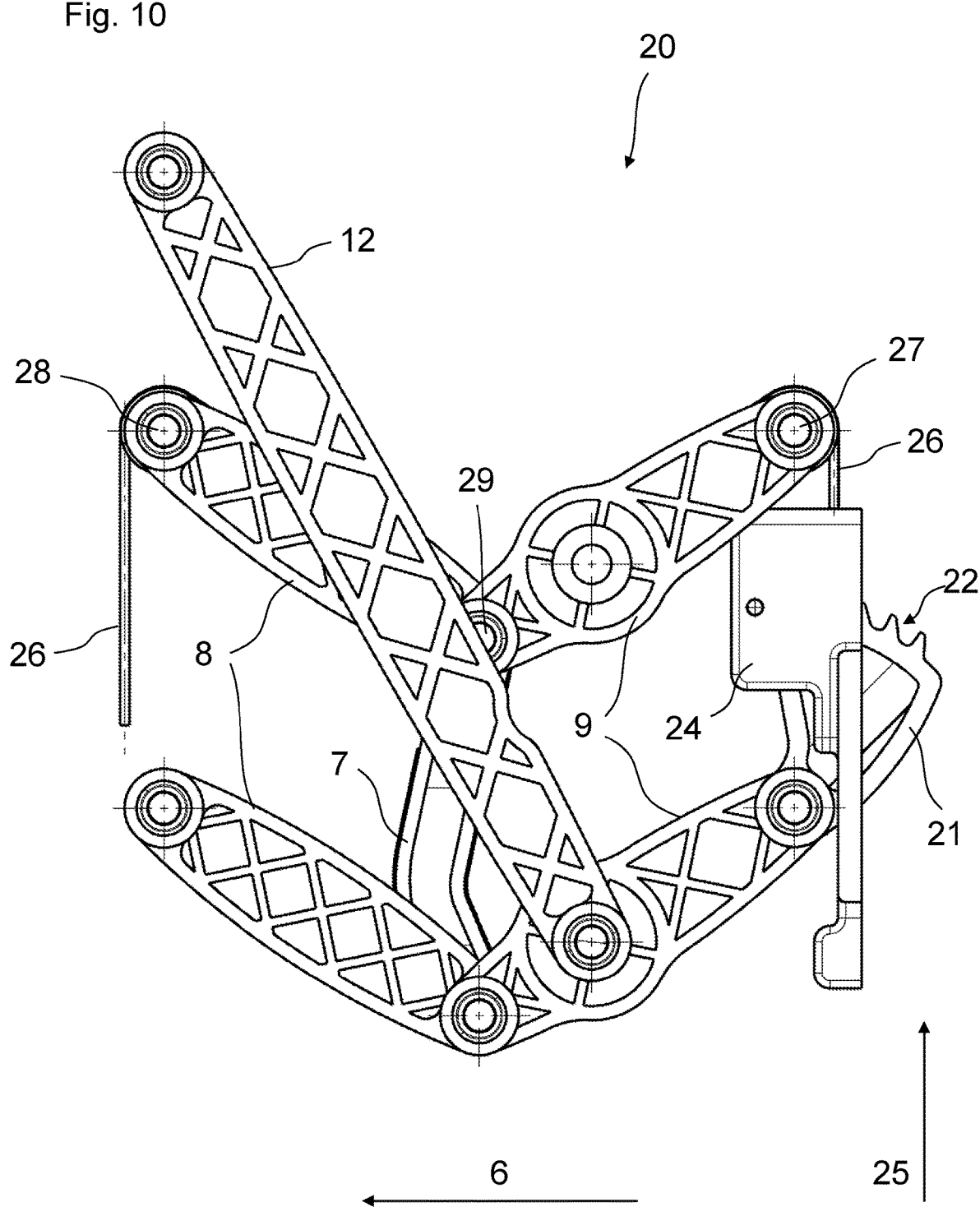
Figure 11:
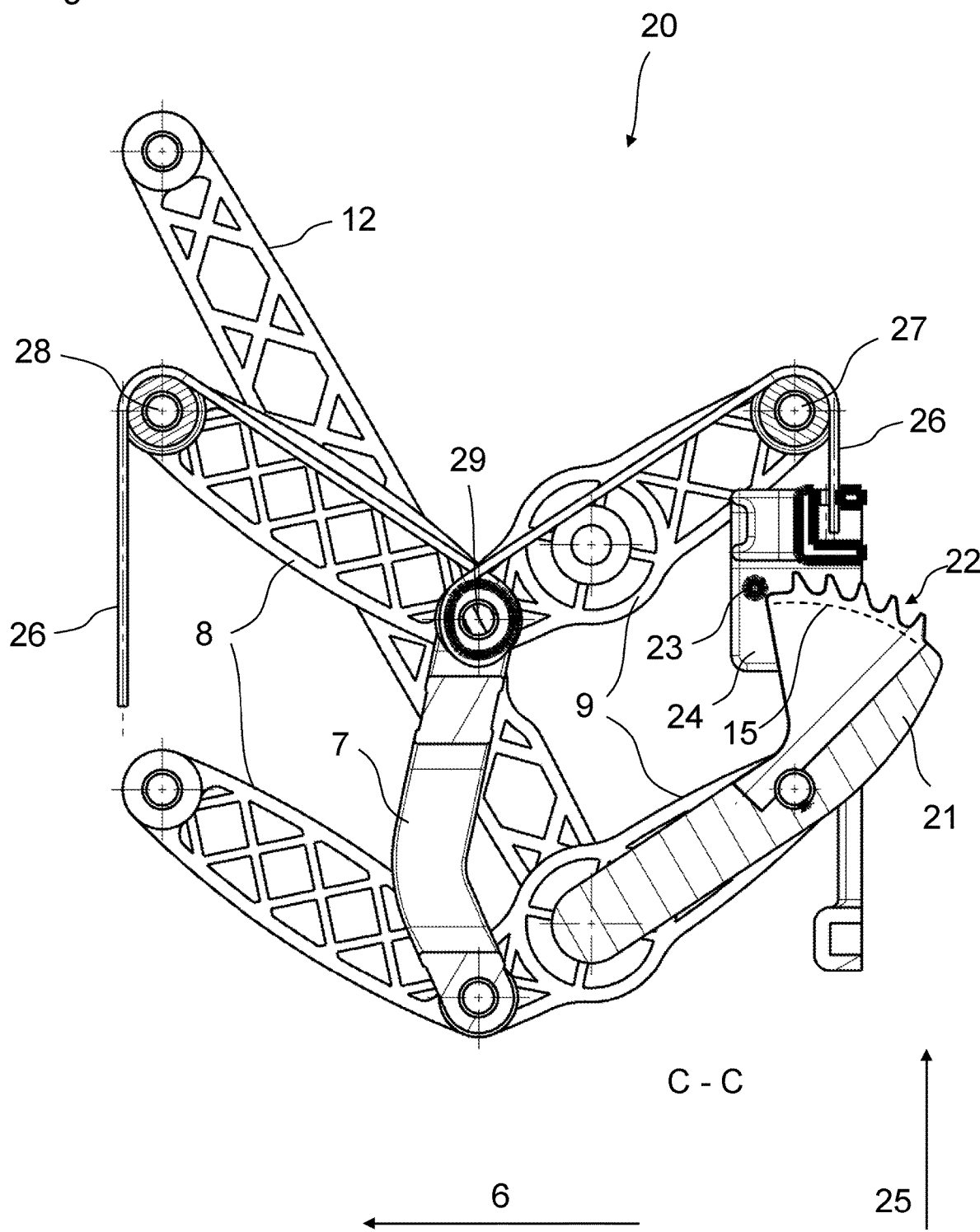
Figure 12:
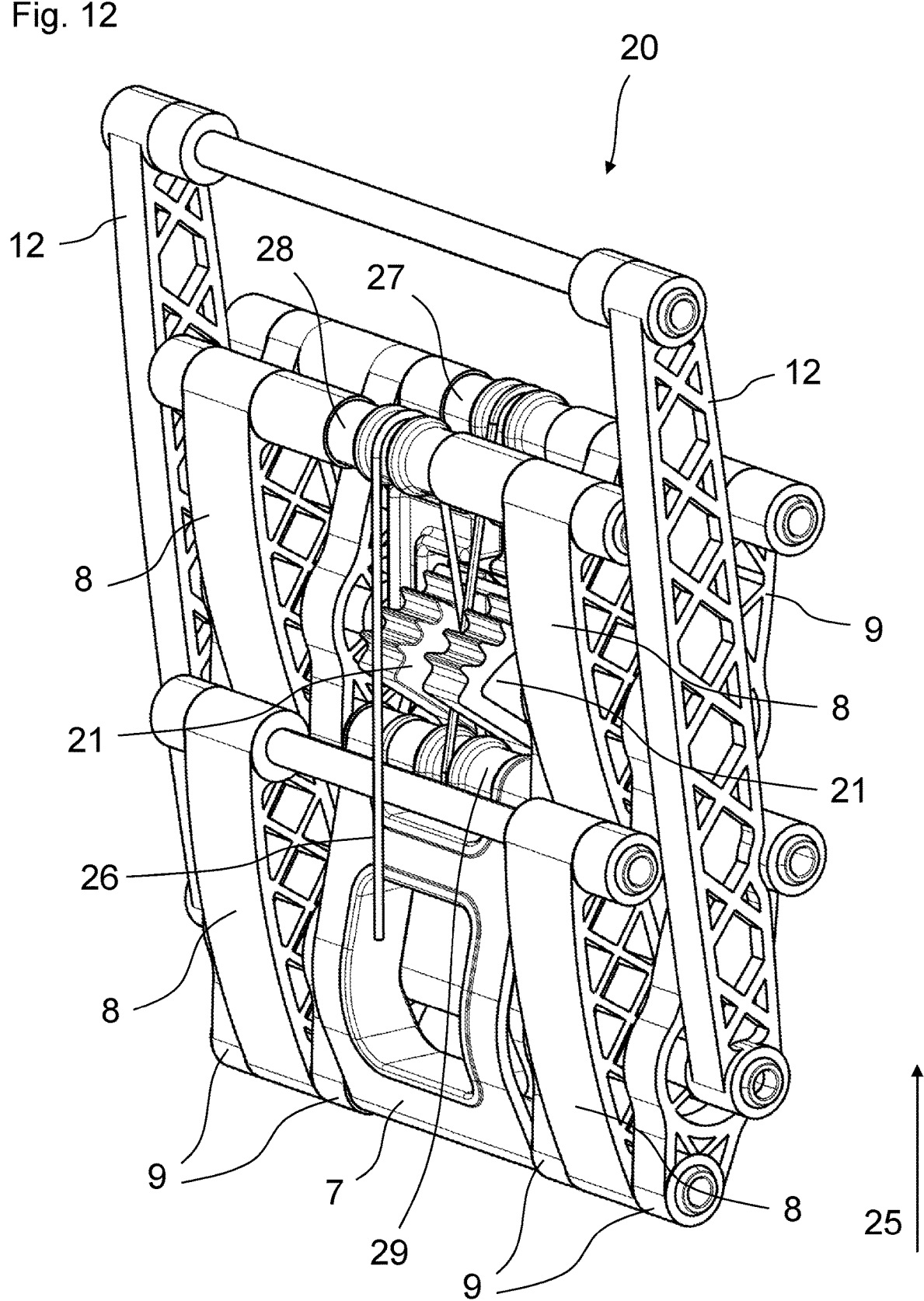
Figure 13:
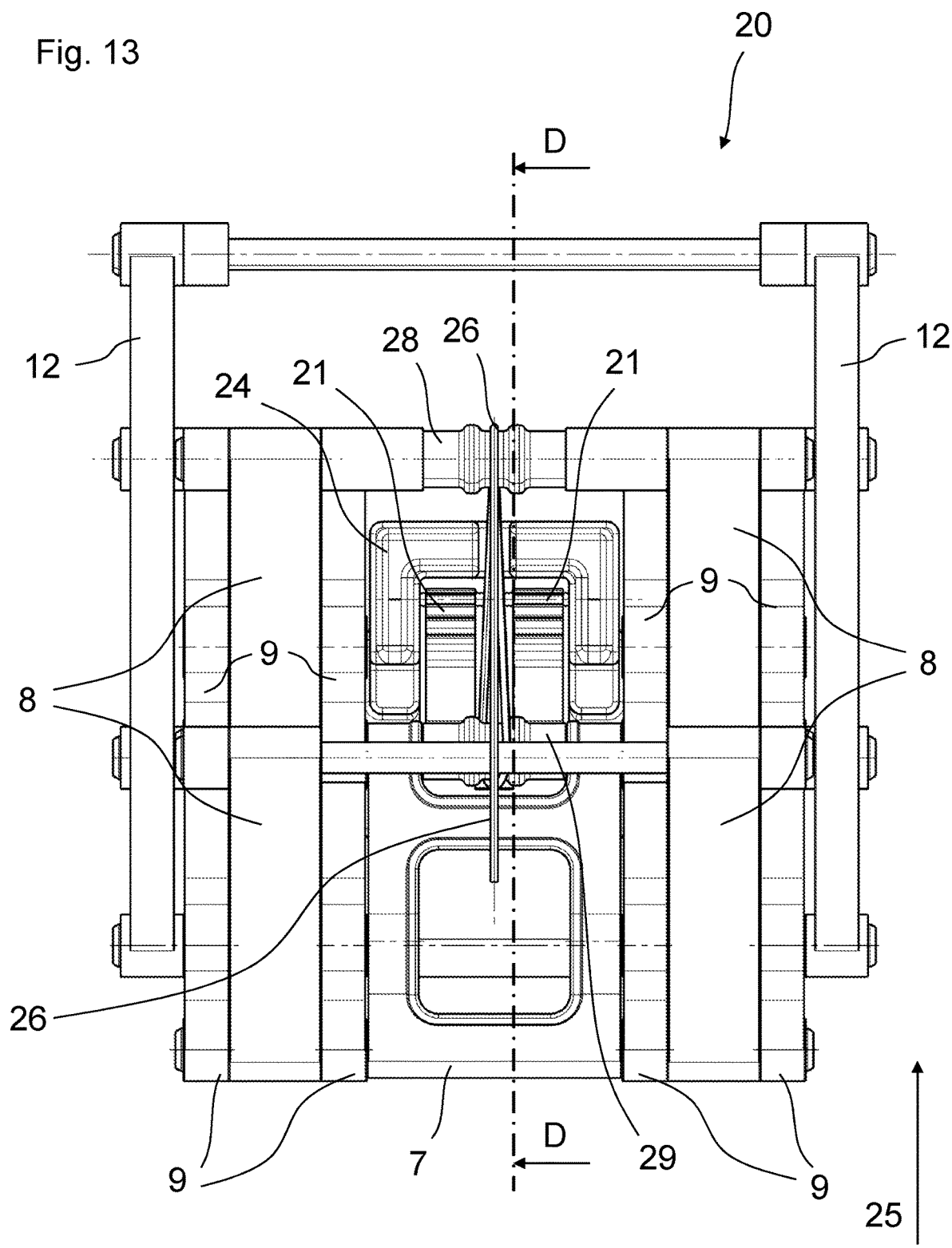
Figure 14:
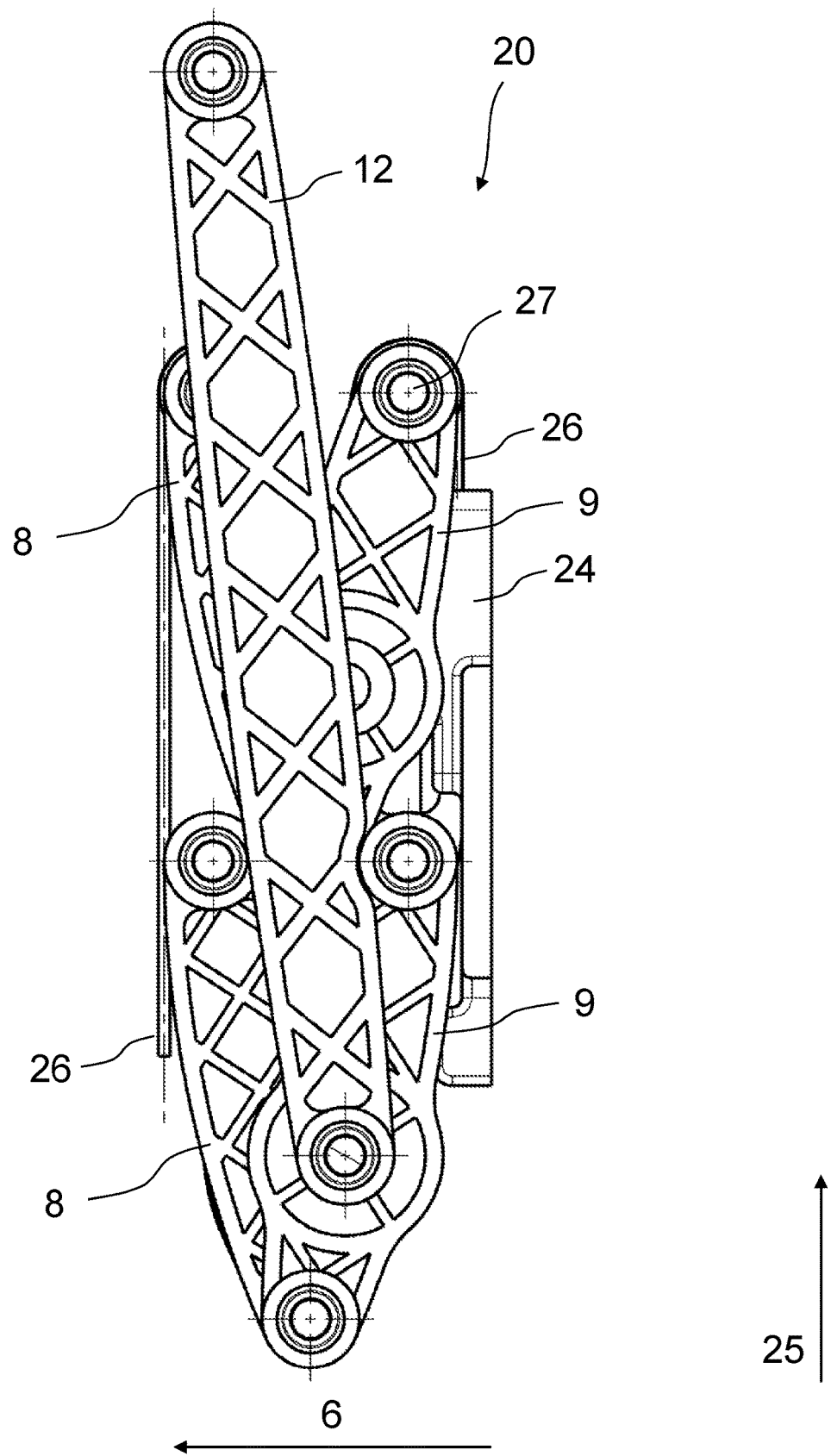
Figure 15:
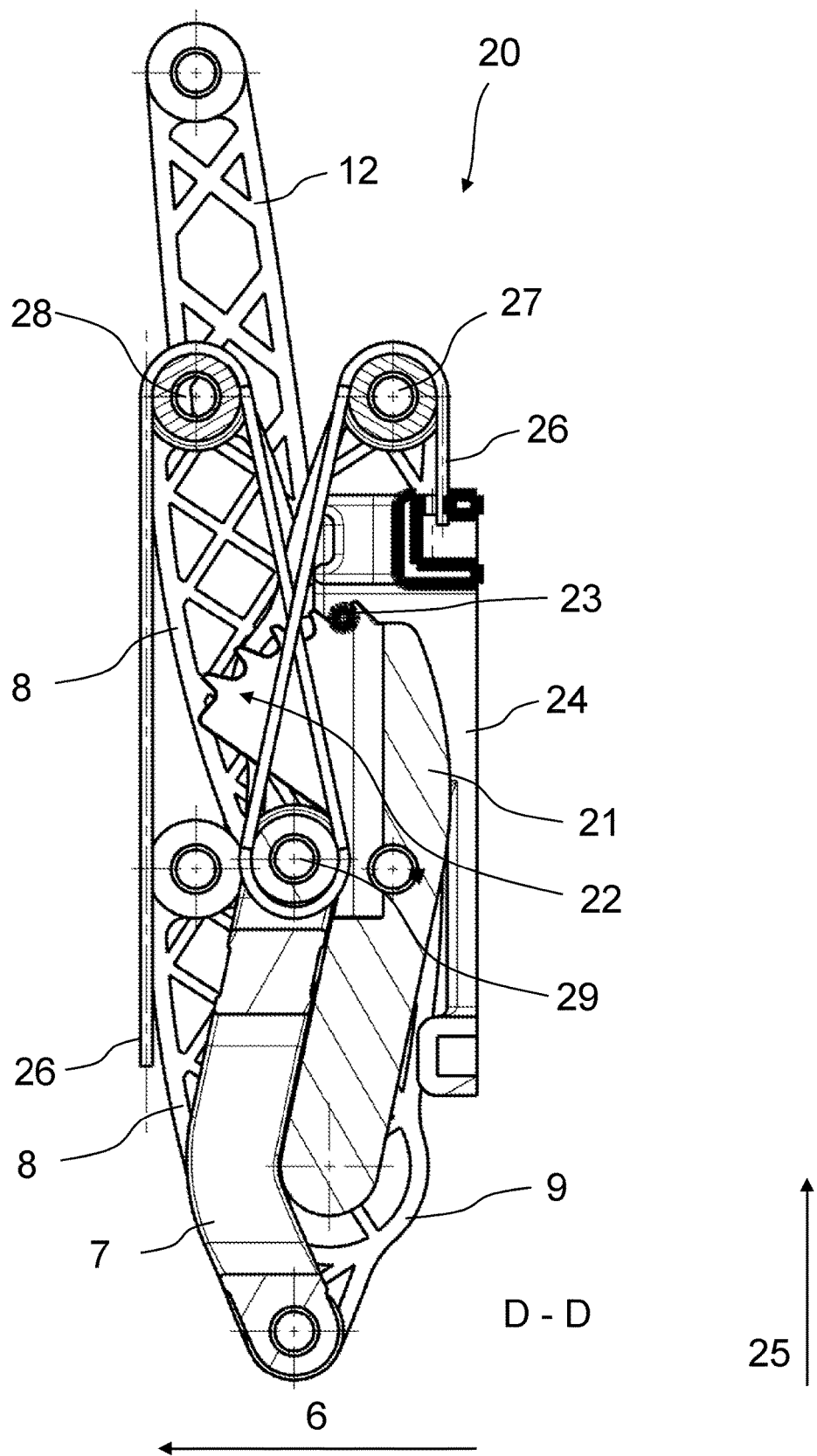

Other advantages and features of the present disclosure become apparent from the following description of two exemplary embodiments of the present disclosure, which shall be understood not to be limiting and which will be explained below with reference to the drawing. In this drawing, the Figures schematically show:

FIG. 1 is a side view of a first exemplary embodiment of a headrest with an adjusting device according to the present disclosure in a maximum position, FIG. 2 is a side view of the adjusting device of the headrest from FIG. 1 in a minimum position, FIG. 3 is a perspective view of the adjusting device of the headrest from FIG. 1, viewed obliquely from the front, in the minimum position, FIG. 4 is a front view of the adjusting device of the headrest from FIG. 1 in the maximum position, FIG. 5 is a front view of the adjusting device of the headrest from FIG. 1 in the minimum position, FIG. 6 is a lateral sectional view of the adjusting device of the headrest from FIG. 1 in the maximum position, along the section line A-A shown in FIG. 4, FIG. 7 is a lateral sectional view of the adjusting device of the headrest from FIG. 1 in the minimum position, along the section line B-B shown in FIG. 5, FIG. 8 is a perspective view of a headrest of an adjusting device of a second exemplary embodiment of a headrest according to the present disclosure in a maximum position, viewed obliquely from the front, FIG. 9 is a front view of the adjusting device from FIG. 8 in the maximum position, FIG. 10 is a side view of the adjusting device from FIG. 8 in the maximum position, FIG. 11 is a lateral sectional view of the adjusting device of the headrest from FIG. 8 in the maximum position, along the section line C-C shown in FIG. 9, FIG. 12 is a perspective view of the adjusting device from FIG. 8, viewed obliquely from the front, in a minimum position, FIG. 13 is a front view of the adjusting device from FIG. 12 in the minimum position, FIG. 14 is a side view of the adjusting device from FIG. 12 in the minimum position, and FIG. 15 is a lateral sectional view of the adjusting device from FIG. 12 in the minimum position, along the section line D-D shown in FIG. 13.

In the different figures, parts that are equivalent with respect to their function are always provided with the same reference numerals, so that they are also only described once, as a rule.

FIG. 1 constitutes a side view of a first exemplary embodiment of a headrest 1 with an adjusting device 2 according to the present disclosure in a maximum position, for a vehicle which is not depicted. As is apparent from FIG. 1, the headrest 1 has a base part 3 for attachment to a backrest of a vehicle seat (both not shown) and a head part 4 configured for contact with a head of a vehicle occupant (also not shown). The base part 3 may be connected to the backrest of the vehicle seat in a manner known per se and thus attached thereto, in particular in a indirect manner, e.g. via corresponding holding rods or holding brackets (not shown). On its front, the head part 4 provides a head contact surface 5 for contact with the head of the vehicle occupant. In the maximum position shown in FIG. 1, the distance between the base part 3 and the head part 4 is at maximum.

As is apparent from FIG. 1, the adjusting device 2 is disposed between the base part 3 and the head part 4 for causing a substantially linear adjustment of the head part 4 relative to the base part 3 between a minimum position (see, for example, FIG. 2) and a maximum position shown in FIG. 1. In the exemplary embodiment of the headrest 1 shown in FIG. 1, the adjusting device 2 is designed to perform an adjustment of the headrest 1 installed in the vehicle in a direction substantially parallel to a longitudinal vehicle axis 6, or in a direction intersecting the longitudinal vehicle axis 6 at an acute angle (longitudinal adjustment).

It is also apparent from FIG. 1 that the adjusting device 2 has an intermediate part 7 and several pivot levers 8 and 9 which pivot in a pivoting motion synchronously during the adjustment. Here, the pivot levers 8 and 9 are arranged and configured in such a way that the pivot levers 8 and 9 form at least one first articulated parallelogram 10 between the head part 1 and the intermediate part 7 and at least one second articulated parallelogram 11 between the intermediate part 7 and the base part 3. In particular, it is apparent from FIG. 1 that the two pivot levers 8 visible in the side view form the first articulated parallelogram 10 together with the head part 4 and the intermediate part 7, and the two pivot levers 9 visible in the side view form the second articulated parallelogram 11 together with the intermediate part 7 and the base part 3.

It is further apparent from FIG. 1 that the adjusting device 2 further has at least one further synchronizing lever 12 disposed between the head part 4 and the base part 3, for setting a relative orientation of the head part 4 with respect to the base part 3 during adjustment and for synchronizing the pivoting motion of the pivot levers 8 of the first articulated parallelogram 10 with the pivoting motion of the pivot levers 9 of the second articulated parallelogram 11. For this purpose, as can be seen in the exemplary embodiment of the headrest 1 shown in FIG. 1, the synchronizing lever 12 is pivotably hinged on one end to the head part 4, and on the other end to the lower one of the two pivot levers 9 of the second articulated parallelogram 11.

It can also be seen in FIG. 1 that the headrest 1 shown in FIG. 1 has a latching device including at least one latching lever 13, in order to fix the headrest 4, or the distance thereof, relative to the base part 3 in a latching manner. In particular, in the exemplary embodiment of the headrest 1 shown in FIG. 1, the latching device or the latching lever 13 is operatively disposed between the base part 3 and the intermediate part 7, wherein the latching lever 13 is unilaterally mounted on the base part 3 in a pivotable manner. Furthermore, a latching contour 14 defining several latching stages is formed on the latching lever 13, wherein the arrangement of the latching stages of the latching contour 14 is defined by a curvature 15 (see FIG. 6). For latching, the latching stages of the latching contour 14 can be brought into engagement with a latching bar 16 provided on the intermediate part 7 (see FIGS. 4 and 6). The latching lever 13 and latching bar 16 substantially form the latching device described herein.

It is further apparent from FIG. 1 that the latching lever 13 has, at the end thereof pivotably fixed to the base part 3, a latching lever extension 17 which defines an actuating surface for manual unlatching. Preferably, the latching lever 13 is elastically biased, establishing the latching engagement.

Furthermore, the exemplary embodiment shown in FIG. 1 of the headrest 1 includes a toggle mechanism 18 provided between the head part 4 and the base part 3. With this toggle mechanism 18, the adjustment of the head part 4 relative to the base part 3 can be limited in the maximum position and additionally retained in a stabilizing manner. However, the maximum position may also be effected alone, i.e. without the toggle mechanism 18, by means of the kinematic system and the set geometric relationships of the pivot levers 8, which are pivotably hinged to the head part 4, of the first articulated parallelogram 10, the pivot levers 9 of the second articulated parallelogram 11 hinge-linked to the latter and hinged to the base part 3, and the synchronizing levers 12 also pivotably hinged to the head part 4 and the intermediate part 7.

FIG. 2 represents a side view of the adjusting device 2 of the headrest 1 from FIG. 1 in a minimum position. For the sake of clarity, the base part 3 and the head part 4 are not shown in FIG. 2. In the illustrated minimum position, the distance between the base part 3 (FIG. 1), which is not shown here, and the head part 4 (FIG. 1), which is also not shown here, is at maximum.

FIG. 3 represents a perspective view of the adjusting device 2 of the headrest 1 from FIG. 1, viewed obliquely from the front, in the minimum position. In this view, it is apparent that two pivot levers 8, respectively, of the first articulated parallelogram 10 (see FIG. 1) and two pivot levers 9 of the second articulated parallelogram 11 (see FIG. 1) are disposed on both sides of the intermediate part 7 in the exemplary embodiment of the headrest 1 or of the adjusting device 2 shown here. In the illustrated exemplary embodiment of the adjusting device 2, each pivot lever 9 is configured to be U-shaped with two legs extending parallel to each other, which are visible in FIG. 3 and which are connected to each other via a connecting means that connects the two legs with each other and is not visible in the illustration of FIG. 3. On the one end, the pivot levers 8 are each pivotably hinged to the intermediate part 7, and on the other end respectively pivotably hinged to the head part 4 (FIG. 1). On the one end, the pivot levers 9 are each pivotably hinged to the intermediate part 7, and on the other end respectively pivotably hinged to the base part 3 (FIG. 1). As is apparent from FIG. 3, one pivot lever 8, respectively, is disposed between two legs of a pivot lever 9, wherein one leg of the pivot lever 9 (inner leg of the pivot lever 9) is disposed on the inner face of the corresponding pivot lever 8, and the other leg of the same pivot lever 9 (outer leg of the pivot lever 9) on the outer face of the corresponding pivot lever 8.

In the headrest 1 or the adjusting device 2 shown in FIG. 3, two synchronizing levers 12 are provided, wherein one is disposed on the left side and one on the right side of the intermediate part 7. As is apparent in FIG. 3, the synchronizing levers 12 are respectively pivotably hinged at their lower ends to the lower outer leg of the corresponding pivot lever 9 of the second articulated parallelogram 11 (FIG. 1). The respectively opposite end of the synchronizing levers 12 is pivotably hinged to the head part 4 shown in FIG. 1.

FIG. 4 represents a front view of the adjusting device 2 of the headrest 1 from FIG. 1 in the maximum position. In this view, the latching bar 16 disposed on the intermediate part 7 is apparent, with which the latching stages of the latching contour 14 (FIG. 1) of the latching lever 13 can be brought into engagement for fixing the adjustment device 2 in a latching manner.

FIG. 5 represents a front view of the adjusting device 2 of the headrest 1 from FIG. 1 in the minimum position.

FIG. 6 represents a lateral sectional view of the adjusting device 2 of the headrest 1 from FIG. 1 in the maximum position, along the section line A-A shown in FIG. 4. On the one hand, the curved extent 15 of the latching contour 14 is clearly recognizable, as well as, on the other hand, the latching bar 16, which cooperates with the latching stages of the latching contour 14 and is provided on the intermediate part 7.

FIG. 7 represents a lateral sectional view of the adjusting device 2 of the headrest 1 from FIG. 1 in the minimum position, along the section line B-B shown in FIG. 5.

As the synopsis of FIGS. 1, 4 and 6 makes apparent, the latching device of the adjusting device 2 including the latching lever 13 and the latching bar 16, at least in the maximum position, is disposed at least partially within the structural volume defined by the first and second articulated parallelograms 10 and 11, and even completely in the depicted exemplary embodiment of the headrest 1 or adjusting device 2, with the exception of a latching lever extension 17.

FIG. 8 represents a perspective view of a headrest of an adjusting device 20 of a second exemplary embodiment of a headrest, which is not shown in more detail, according to the present disclosure in a maximum position, viewed obliquely from the front. In order to form the headrest, in analogy to the headrest 1 from FIG. 1, a headrest (not shown) for contact with a head of a vehicle occupant (not shown) can be attached to the front of the adjusting device 20 facing towards the observer in FIG. 8, and a base part (also not shown) for attachment to a backrest of a vehicle seat (both not shown) can be attached to the rear of the adjusting device 20 facing away from the observer.

In contrast to the adjusting device 2 of the headrest 1 shown in FIG. 1, the second exemplary embodiment of the adjusting device 20 shown in FIG. 8 has a latching device, which is different to the adjusting device 2, is not fully discernible in FIG. 8, and will be explained in more detail in connection with the description of FIGS. 10, 11, 12 and 15. Also, the adjusting device 20 has no toggle mechanism 18 (FIG. 1). Among other things, this means that in the adjusting device 20, the limitation of the adjustment in the maximum position shown in FIG. 8 is effected only by means of the kinematic system and the set geometric relationships of the total of four pivot levers 8, which are pivotably hinged to the head part (not shown), of the first articulated parallelogram 10 (see FIG. 1), the pivot levers 9 of the second articulated parallelogram 11 (see FIG. 1) hinge-linked to the latter and hinged to the base part, which is also not shown, and the two synchronizing levers 12 also pivotably hinged to the head part. In other words, the movement mechanism of the intermediate part 7, the pivot levers 8 and 9 and the synchronizing levers 12 results in an automatic inhibition of the movement of the adjusting device 20 in its maximum position while the headrest is adjusted, so that the distance of the head part relative to the base part cannot be increased beyond the defined maximum position.

As is already the case in the adjusting device 2 of the headrest 1 from FIG. 1, the adjusting device 20 shown in FIG. 8 also has a total of four pivot levers 8 and four U-shaped pivot levers 9 with, in each case, two spaced-apart legs extending parallel to each other, wherein one leg of the pivot lever 9, respectively, is attached to each pivot lever 8 at the inner face and the outer face thereof (corresponding to an inner and an outer leg of the same pivot lever 9).

FIG. 9 represents a front view of the adjusting device 20 from FIG. 8 in the maximum position, FIG. 10 represents a side view of the adjusting device 20 from FIG. 8 in the maximum position, and FIG. 11 represents a lateral sectional view of the adjusting device 20 from FIG. 8 in the maximum position, along the section line C-C shown in FIG. 9.

The illustrations of the adjusting device 20 corresponding to FIGS. 8-11 in the minimum position are shown in FIGS. 12-15. Accordingly, FIG. 12 represents a perspective view of the adjusting device 20 from FIG. 8, viewed obliquely from the front, in the minimum position, FIG. 13 represents a front view of the adjusting device 20 from FIG. 12 in the minimum position, FIG. 14 represents a side view of the adjusting device 20 from FIG. 12 in the minimum position, and FIG. 15 represents a lateral sectional view of the adjusting device 20 from FIG. 12 in the minimum position, along the section line D-D shown in FIG. 13.

FIG. 11 clearly shows the latching device of the second exemplary embodiment of the adjusting device 20. The latching device has at least one latching lever 21 with a latching contour 22 extending along a curvature and having several latching stages, as well as a latching bar 23 that can be brought into engagement with the latching stages of the latching contour 22 in different positions of the adjusting device 20, in order to fix, in a latching manner, the headrest (not shown), which can be attached to the pivot levers 8 and the synchronizing lever 12, or the distance thereof relative to the base part (also not shown), which can be attached to the pivot levers 9.

As is apparent from FIG. 11 in particular, the latching lever 21 in the adjusting device 20 is disposed on the inner face of the inner leg of the lower pivot lever 9 and preferably firmly connected therewith, so that the pivot lever 21 follows the pivoting movement of the inner leg of the lower pivot lever 9 when the adjusting device 20 is adjusted, and, in particular when the adjusting device 20 is adjusted, pivots together with the inner leg of the lower pivot lever 9 around the articulation point of the pivot lever 9 on the base part (not shown).

The latching bar 23 is arranged in such a way that the latching contour 22 of the latching lever 21 can be brought into a latching engagement with it. For example, the latching bar 23 can be retained on the base part (not shown), wherein the latching bar 23 is movably or displaceably mounted for manual unlatching, for example by means of a linear displacing movement from the latching contour 22 of the latching lever 21. Preferably, the latching bar 23 in this case is elastically biased, establishing the latching engagement.

It is apparent from FIGS. 10 and 11 that in the depicted exemplary embodiment of the adjusting device 20, the latching bar 23 is accommodated or retained, in its longitudinal dimension perpendicular to the plane of the drawing 11, in a housing 24, and is displaceably mounted therein in the direction of a vertical vehicle axis 25 in the state of the adjusting device 20 or headrest being installed in the vehicle. In order to effect this linear displacement of the latching bar 23 in the vertical vehicle direction 25, the latching bar 23 is operatively connected to an actuating means 26, which is shown in FIGS. 8-15 and which is a pulling means 26 in the form of a pull cable in the embodiment shown, in order to be able to cause manual unlatching of the latching device.

As is clearly apparent from FIG. 11, for example, the pull cable 26 in the adjusting device 20 is diverted on the side of the base part via an axis 27 connecting at least the articulation points of the upper pivot levers 9 on the base part (not shown) with each other, and, at the end side, is connected to the latching bar 23 either directly or by interposition of additional components guiding the displacing movement of the latching bar 23. The opposite end of the pulling means 26 is diverted on the side of the head part by an axis 28 which connects at least the articulation points of the upper pivot levers 8 on the head part (not shown) with each other. Thus, the latching bar 23 can be brought out of the latching engagement with the latching contour 22 of the latching lever 21 by pulling the pull cable 26 at the end thereof on the side of the head part, and the adjusting device 20 can consequently be manually unlatched in order to be adjusted.

Preferably, an actuating member (not shown), e.g. a button, switch, lever and the like, is attached to the headrest (also not shown), by means of which the actuating means or the pull cable 26, and thus the latching bar 23, can be actuated. This is particularly advantageous in that the manual unlatching of the adjusting device 20 can be carried out comfortably by a vehicle occupant because the actuating member on the head part is easily accessible and moves together with the head part while the adjusting device 20 is adjusted. Besides the actuating member, which is not shown and which is preferably disposed on the head part, the actuating means or pull cable 26 also follows the adjusting movement caused by the adjustment of the adjusting device 20.

In this case, however, it must be taken into account that the cable length of the pull cable 26 between the actuating member (not shown), which is attached to the head part (also not shown), for example, and the latching bar 23 always remains constant during the adjusting movement of the adjusting device 20, because a change of this cable length would otherwise result in an unwanted movement or displacement of the latching bar 23 along the vertical vehicle axis 25, which in turn could lead to an uncontrolled latching of the latching bar 23 into the latching contour 22 of the latching lever 21. A precise manual adjustment of the adjusting device 20 into a desired position is thus not ensured.

In order to ensure an always constant pull cable length independent of the momentary adjusting position of the adjusting device 20 between the actuating member (not shown) on the side of the head part and the latching bar 23 on the side of the base part, the embodiment of the adjusting device 20 shown provides for another diversion of the pull cable 26 about an axis 29 connecting the upper articulation points of the upper pivot levers 9 on the intermediate part 7, as is apparent, in particular, in FIG. 11. In this case, the pull cable loops 26 around the axis 29 in such a way that the path of the pull cable 29 crosses itself above the axis 29, as can be clearly seen in the lateral sectional view of FIG. 11.

Though the distance of the axis 27 to the axis 29 and the distance of the axis 28 to the axis 29 remain constant during an adjustment of the adjusting device 20, the angular positions of the axes 27 and 28, however, in each case change relative to the axis 29 due to the pivoting movement of the pivot levers 8 and 9. As a consequence of this relative movement of the axes 28 or 27 in a circle around the axis 29, the length of the cable section resting on the circumference around the axes 27, 28 and 29 (herein also referred to as the looping length) changes. In particular, the looping length of the pull cable 26 around the axes 27 and 28 decreases in the event of an adjustment from the minimum position into the maximum position of the adjusting device 20 due to the axes 27 and 28 moving away from each other in the process. This can be seen, for example, in a comparison of the minimum position of the adjusting device 20 shown in FIG. 15 with the maximum position of the adjusting device 20 shown in FIG. 11.

In order to compensate the decrease of the looping length of the pull cable 26 around the axis 27 and the axis 28, which is caused during this adjustment, the pull cable 26 is looped around the axis 29 in the above-described manner, which is clearly recognizable in FIGS. 11 and 15, because the looping length of the pull cable 26 around the axis 29 advantageously increases, during the adjustment from the minimum position into the maximum position of the adjusting device 20, by as much as the looping length of the pull cable 26 around the axis 27 and 28 decreases in the process. In an opposite adjusting movement of the adjusting device 20, i.e. from the maximum position into the minimum position, for example, the opposite is true, that is, the looping length of the pull cable 26 around the axis 29 decreases while the looping length of the pull cable 26 around the axes 27 and 28 increases correspondingly. In this manner, a constant cable length of the pull cable 26 between the end thereof on the side of the head part, which is preferably connected to an actuating member (not shown) moving together with the head part (also not shown), and the end thereof connected to the latching bar 23 is always ensured, i.e. in the case of any adjustment of the adjusting device 20, so that an always controlled latching of the adjustment device 20 in the desired adjusting position can be effected.

It is also apparent in FIG. 12 that the exemplary embodiment of the adjusting device 20 shown has a U-shaped latching lever 21 with two legs extending parallel to each other and spaced apart from each other, one of which is respectively disposed on the inner face of the inner leg of the corresponding lower pivot lever 9 and firmly connected therewith. The U-shaped configuration of the latching lever 21 with the space provided between the two legs is advantageous in that the actuating means or pull cable 26 of the adjusting device 20 can run unimpededly in this space.

It is also apparent from FIGS. 14 and 15 that the latching device, i.e. the latching lever 21 and the latching bar 23, at least in the minimum position of the adjusting device 20 shown, is disposed completely within the structural volume defined by the first and second articulated parallelograms 10 and 11 (see FIG. 1).

In a preferred embodiment, the headrest according to the present disclosure is used in a motor vehicle, in particular as a headrest with a longitudinal adjustment.

The invention claimed is:

1. A headrest for a motor vehicle, comprising:
a base part for attachment to a backrest of a vehicle seat;
a head part configured for contact with a head of a vehicle occupant;
an adjusting device between the base part and the head part for causing a substantially linear adjustment of the head part between a minimum position and a maximum position relative to the base part, wherein the adjusting device has an intermediate part and several pivot levers, including at least two first pivot levers between the head part and the intermediate part, and at least two second pivot levers between the intermediate part and the base part, where the intermediate part and the several pivot levers pivot in a pivoting motion synchronously during the adjustment of the head part and are arranged and configured in such a way that at least one first articulated parallelogram is formed between the head part and the intermediate part with the at least two first pivot levers and at least one second articulated parallelogram is formed between the intermediate part and the base part with the at least two second pivot levers, and the adjusting device has at least one further synchronizing lever between the head part and the base part for setting a relative orientation of the head part with respect to the base part during adjustment of the head part and for synchronizing the pivoting motion of the at least two first pivot levers of the first articulated parallelogram with the pivoting motion of the at least two second pivot levers of the second articulated parallelogram, wherein the headrest further has a latching device for fixing the headrest in a latching manner relative to the base part; and
a toggle mechanism configured to limit the adjustment of the head part relative to the base part when the head part is in the maximum position.

2. The headrest of claim 1, wherein the latching device has a unilaterally pivotably mounted latching lever.

3. The headrest of claim 2, wherein the latching device has a latching contour, which defines several latching stages and is preferably formed on the unilaterally pivotably mounted latching lever.

4. The headrest of claim 3, wherein an arrangement of the latching stages of the latching contour is defined by a curvature.

5. The headrest of claim 2, wherein the unilaterally pivotably mounted latching lever is pivotably mounted on the base part.

6. The headrest of claim 2, wherein the unilaterally pivotably mounted latching lever has a pivotably fixed end, wherein at the pivotably fixed end there is a latching lever extension which defines an actuating surface for manual unlatching.

7. The headrest of claim 6, wherein the adjusting device has at least two first and two second articulated parallelograms, and the latching device, when the head part is in the maximum position, is disposed at least partially, preferably completely, within a structural volume defined by the first and second articulated parallelograms, with the exception of a latching lever extension formed on the unilaterally pivotably mounted latching lever at the pivotably fixed end thereof.

8. The headrest of claim 2, wherein the unilaterally pivotably mounted latching lever latching lever is elastically biased, establishing a latching engagement.

9. The headrest of claim 1, wherein the latching device has at least one latching lever connected to one of the at least two second pivot levers of one of the second articulated parallelogram.

10. The headrest of claim 9, wherein the adjusting device has at least two first and two second articulated parallelograms, and the latching device, when the head part is in the minimum position, is disposed at least partially within a structural volume defined by the first and second articulated parallelograms.

11. The headrest of claim 9, wherein the latching device has an actuating means for manual unlatching, which follows an adjusting movement of the adjusting device caused during adjustment of the adjusting device and is operatively connected to the latching device.

12. The headrest of claim 1, wherein the latching device is operatively disposed between the base part and the intermediate part or between the base part and one of at least two second pivot levers of the second articulated parallelogram.

13. The headrest of claim 1, wherein the at least one synchronizing lever is hinged to the head part and to one of the pivot levers of the second articulated parallelogram.

14. The headrest of claim 1 configured for use in a motor vehicle as a headrest with a longitudinal adjustment.

* * * * *